(12) United States Patent
Vittimberga

(10) Patent No.: US 12,473,938 B2
(45) Date of Patent: Nov. 18, 2025

(54) MAGNETIC CLIPS

(71) Applicant: Paul Vittimberga, Pollock Pines, CA (US)

(72) Inventor: Paul Vittimberga, Pollock Pines, CA (US)

( * ) Notice: Subject to any disclaimer, the term of this patent is extended or adjusted under 35 U.S.C. 154(b) by 0 days.

(21) Appl. No.: 18/606,019

(22) Filed: Mar. 15, 2024

(65) Prior Publication Data

US 2024/0401619 A1  Dec. 5, 2024

Related U.S. Application Data

(60) Provisional application No. 63/505,089, filed on May 31, 2023.

(51) Int. Cl.
*F16B 2/02* (2006.01)

(52) U.S. Cl.
CPC ............ *F16B 2/02* (2013.01); *F16B 2200/83* (2023.08)

(58) Field of Classification Search
CPC ........... F16B 2/02; F16B 2200/83; F16B 2/10
See application file for complete search history.

(56) References Cited

U.S. PATENT DOCUMENTS

| | | | |
|---|---|---|---|
| D274,127 S * | 6/1984 | Einhorn | D19/86 |
| 6,302,363 B1 | 10/2001 | Olson | |
| 7,469,869 B2 | 12/2008 | Killion | |
| 10,012,346 B2 | 7/2018 | Killion | |
| D922,863 S * | 6/2021 | Reiter | D8/382 |
| 11,248,635 B2 | 2/2022 | Boettcher et al. | |
| 2003/0019084 A1* | 1/2003 | Wong | A41F 1/006 24/303 |
| 2005/0023420 A1 | 2/2005 | Sadeh et al. | |
| 2005/0167485 A1* | 8/2005 | Taras | A44C 3/001 235/380 |
| 2006/0150304 A1* | 7/2006 | Bentz | A42B 3/08 2/421 |
| 2007/0194187 A1 | 8/2007 | Amron | |
| 2007/0200038 A1 | 8/2007 | Dautrey | |
| 2008/0289225 A1* | 11/2008 | Ali | A41F 17/02 24/72.1 |
| 2011/0314643 A1 | 12/2011 | Huang | |
| 2015/0219130 A1* | 8/2015 | Killion | F16M 13/022 24/507 |
| 2021/0134501 A1* | 5/2021 | de la Rosa | H01F 7/04 |

FOREIGN PATENT DOCUMENTS

JP        H09213522 A        8/1997

* cited by examiner

*Primary Examiner* — David M Upchurch
(74) *Attorney, Agent, or Firm* — Mark Terry

(57) ABSTRACT

A magnetic clip includes a first member comprising a load arm and an effort arm, a magnet, and a fulcrum where the load and effort arms meet, the fulcrum including a protrusion and a depression. The magnetic clip also includes a second member comprising a load arm and an effort arm, a magnet or ferromagnetic material for being attracted to the magnet of the first member, such that the load arm of the first member is attracted to the load arm of the second member and, a fulcrum in the second member including a protrusion and a depression. The protrusion of the second member mates with the depression of the first member and the depression of the second member mates with the protrusion of the first member. Wherein the first and second members are not connected by any structural components and are completely separable.

20 Claims, 9 Drawing Sheets

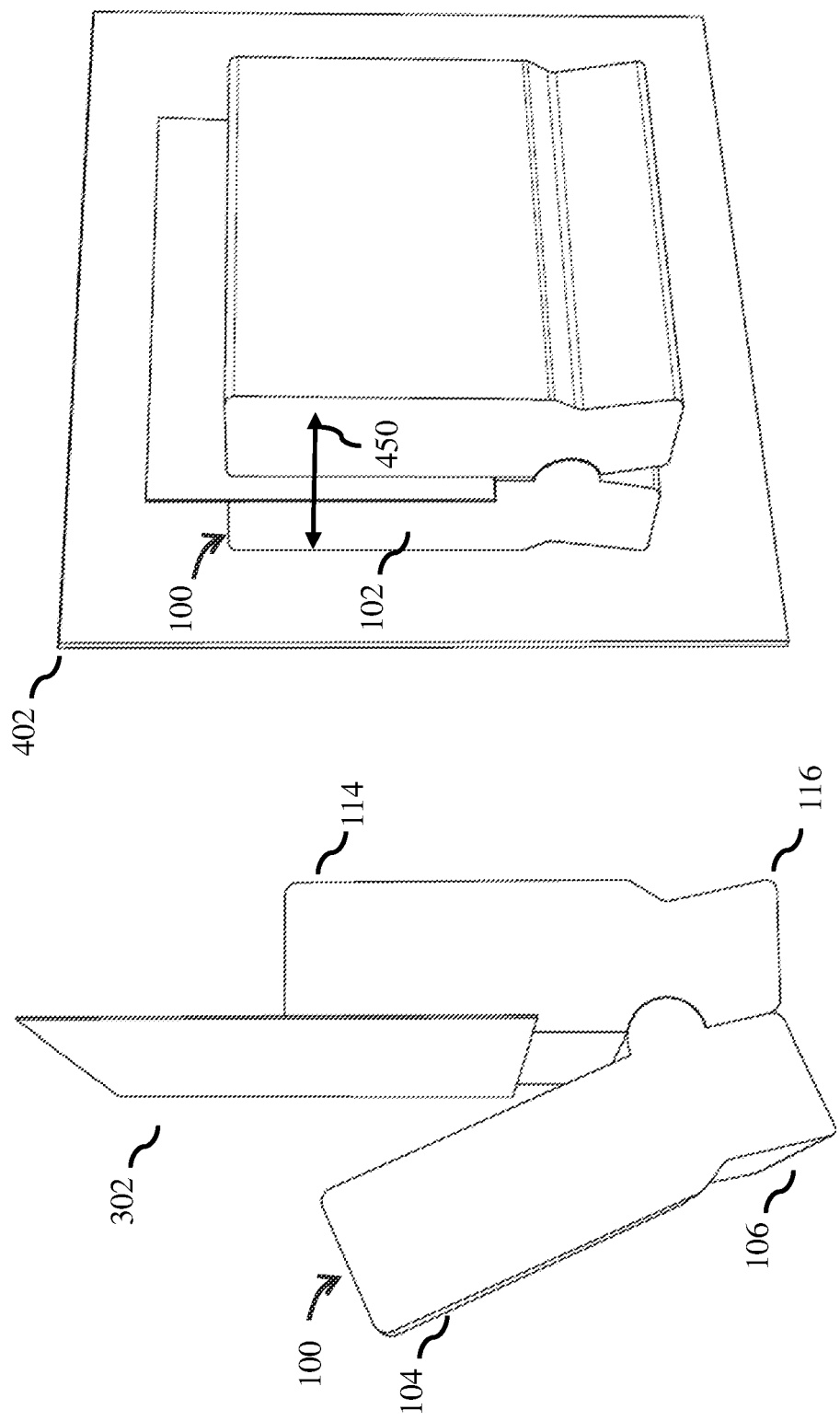

MAGNETIC CLIPS

CROSS-REFERENCE TO RELATED APPLICATIONS

This patent application claims priority to provisional patent application No. 63/505,089 filed on May 31, 2023. The subject matter of patent application No. 63/505,089 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The technical field relates generally to fasteners and, more specifically, relates to the field of clips or holders utilizing magnets.

BACKGROUND

A magnetic clip is a device that uses magnets to hold objects or materials together. It typically consists of a first component or arm that rotates with respect to a second component or arm, wherein one or more magnets may be embedded in said first or second components or arms. When the two magnetized components are brought close to each other, they attract and securely hold the objects or materials in place. The two components are usually held together via a spring, hinge, or the like.

Magnetic clips are commonly used for various purposes, such as holding papers, notes, or photographs on a metal surface like a refrigerator or a whiteboard. Magnetic clips are often designed with a clip or clamp mechanism on one end to easily secure the items. The magnetic force provides a convenient and reliable way to keep things organized, accessible, and visible, without the need for adhesives, pins, or other fastening methods. Magnetic clips are versatile and can be found in various sizes, shapes, and styles to suit different needs and preferences.

One disadvantage of conventional magnetic clips comprising multiple moving parts is the potential for dirt and debris to become embedded within those parts. This can be problematic because the presence of dirt or debris within the moving parts of a magnetic clip can hinder its functionality. It may impede the smooth movement of the components, making it difficult to open, close, or adjust the clip as intended. This can lead to frustration and inconvenience when using the clip. Also, over time, accumulated dirt and debris can affect the durability and lifespan of the magnetic clip. The presence of particles within the moving parts may cause friction, wear, or corrosion, potentially leading to mechanical issues or reduced effectiveness of the clip. The clip may become less reliable or may eventually fail to function altogether. Further, the need for regular cleaning and maintenance arises when dirt and debris can get embedded in the magnetic clip's moving parts. It becomes necessary to disassemble the clip, clean the individual components, and reassemble them to ensure optimal performance. This extra maintenance can be time-consuming and inconvenient for users. Finally, if dirt and debris accumulate within the moving parts of a magnetic clip, it can create unattractive and unsanitary conditions. Dust, grime, or other particles may be visible on the clip's surface, making it appear dirty or unappealing. In environments where cleanliness and appearance matter, such as in food production, this can be a significant disadvantage.

Therefore, a need exists to overcome the problems with the prior art as discussed above, and particularly for a more efficient and cleaner way of providing a magnetic clip.

SUMMARY

A magnetic clip is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a magnetic clip is provided that solves the above-described problems. The magnetic clip includes a first member comprising a load arm and an effort arm, including an obtuse angle between the load and effort arms of the first member, a magnet located within an interior of the first member, and a fulcrum in the first member where the load and effort arms meet, the fulcrum including a protrusion and a depression. The magnetic clip also includes a second member comprising a load arm and an effort arm, including an obtuse angle between the load and effort arms of the second member, a magnet or ferromagnetic material located within an interior of the second member, wherein said magnet or ferromagnetic material of the second member is configured for being attracted to the magnet of the first member, such that the load arm of the first member is attracted to the load arm of the second member and, a fulcrum in the second member where the load and effort arms of the second member meet, the fulcrum of the second member including a protrusion and a depression, such that the protrusion of the second member is configured to movably and removably mate with the depression of the first member and wherein the depression of the second member is configured to movably and removably mate with the protrusion of the first member. Wherein the first and second members are not connected by any structural components and are completely separable.

BRIEF DESCRIPTION OF THE DRAWINGS

The accompanying drawings, which are incorporated in and constitute a part of this disclosure, illustrate various example embodiments. In the drawings:

FIG. 3 depicts a side perspective view of the magnetic clip in use, according to the embodiment of FIG. 1.

FIG. 4 depicts a front perspective view of the magnetic clip in use, according to the embodiment of FIG. 1.

DETAILED DESCRIPTION

Figure 1:
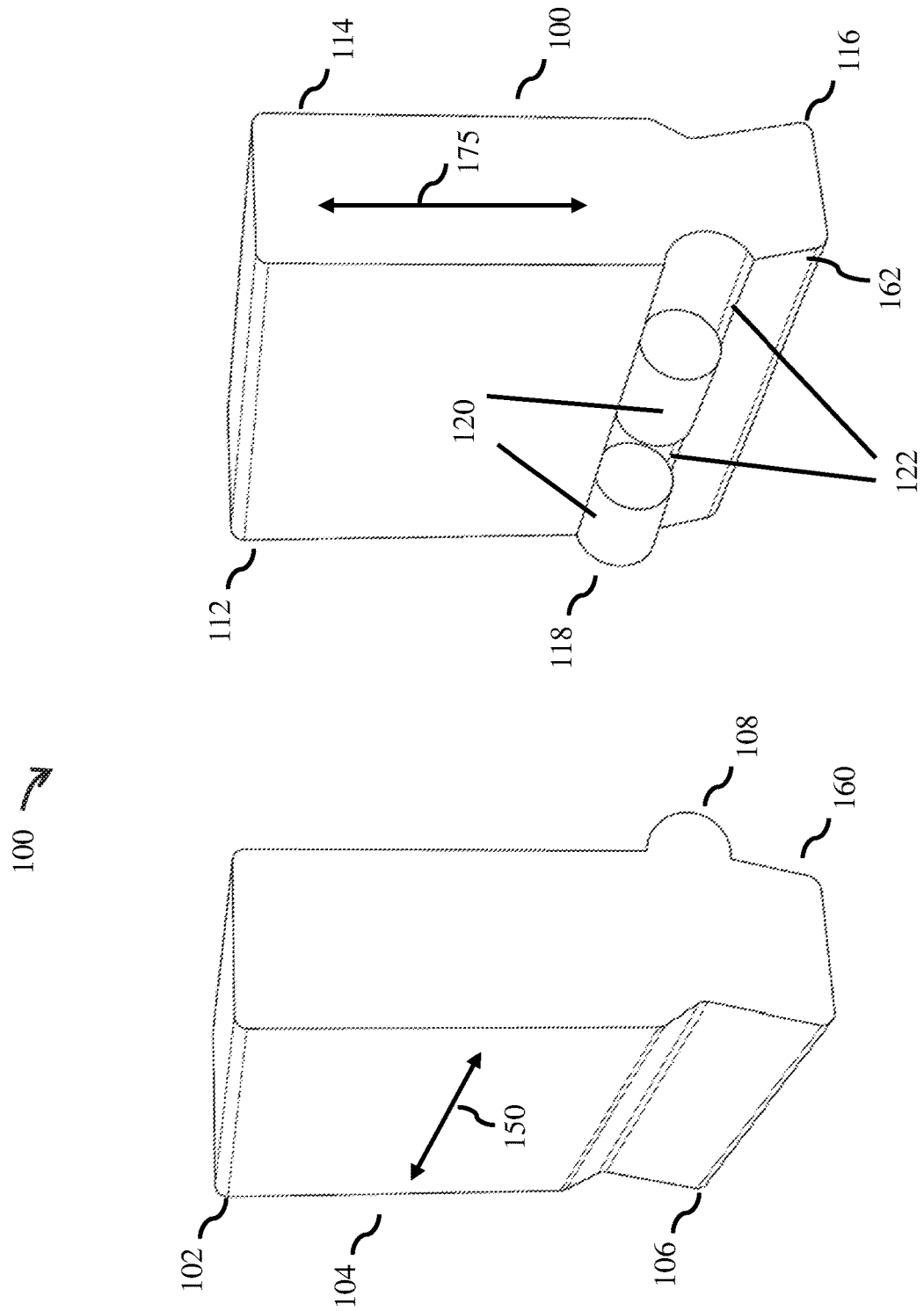
FIG. 1 depicts an exploded side perspective view of a magnetic clip, according to an embodiment.

The following detailed description refers to the accompanying drawings. Wherever possible, the same reference numbers are used in the drawings and the following description to refer to the same or similar elements. While embodiments of the claimed subject matter may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The claimed subject matter improves over the prior art by providing a magnetic clip that is easy to use, straightforward to clean, and cheaply constructed. The claimed subject matter presents an inexpensively manufactured magnetic clip that include no moving parts other than the two main members that perform a gripping action. This feature increases the usability of the device for clipping or gripping items, as well as its ability to be easily cleaned. Further, the claimed subject matter is lightweight and easy to handle so as not to burden the user during use.

The claimed subject matter may also be used while sous vide cooking. The claimed magnetic clips can be used to prevent vacuumed food bags from floating, as submersion is vital for efficient and even sous vide cooking. The claimed subject matter keeps the cooking bags submerged, providing a more compact and flexible alternative to sous vide clips, racks, and weights. The claimed subject matter further improves over the prior art by providing magnetic clips that can be easily taken apart for cleaning, transport, or storage. The claimed subject matter adds to the convenience of sous vide cooking.

This claimed subject matter relates to double-lever magnetic clips, specifically to an improved construction which enables one handed operation similar to a spring clip but that uses magnetism to provide both the connection between the two members at the fulcrum and the closing force of the load arms while having alignment features that keep the fulcrum from moving laterally. The claimed subject matter also provides a bias toward the closed position of the load arms and an optional stop feature to prevent the load arms from opening beyond a point at which they maintain a bias toward the closed position. The two members may be symmetric or non-symmetric and may provide a grip feature on one of both members for human fingers.

There are a variety of magnet related clips in the prior art, all of which suffer from disadvantages. Conventional clips that include springs have a significant disadvantage when rapid separation and reassembly of the members is required as in a commercial kitchen setting. A spring that is securely attached will make disassembly more difficult; conversely a spring that is loosely fastened will make the members insecure. Also, the spring itself is easily misplaced when removed. Other conventional clips cannot be utilized by one hand, as they require two hands. Further, conventional clips do not provide the precision and usability of the fulcrum as in the claimed subject matter. Using two separate magnets requires the use of two hands to place and remove the magnetic pair. Also, the pair are not constantly held in the correct magnetic alignment, so the user must align them each time they are joined.

The accompanying drawings, which are incorporated in and constitute a part of this disclosure, illustrate various example embodiments. The claimed magnetic clip will now be described with respect to FIG. 1 through FIG. 13. FIG. 1 depicts an exploded side perspective view of a magnetic clip 100, according to an embodiment. The claimed magnetic clip 100 includes a first member 102 comprising a load arm 104 and an effort arm 106, and a fulcrum 108 where the load and effort arms meet, the fulcrum including a protrusion and a depression or recess. Magnetic clip 100 also includes a second member 112 comprising a load arm 114 and an effort arm 116, and a fulcrum 118 where the load and effort arms meet, the fulcrum including one or more protrusions 120 and one or more depressions 122. The protrusions 120 of the second member are sized and shaped to mate with the depressions of the first member and the depressions 122 of the second member are sized and shaped to mate with the protrusions of the first member. Note the first and second members are not connected by any structural components (such as fasteners, wires or springs) and are completely separable. Note also that the protrusions of the second member are configured to movably and removably mate with the depressions of the first member and the depressions of the second member are configured to movably and removably mate with the protrusions of the first member.

The first member 102 may include one or more magnets within the interior of the load arm. The second member may include one or more magnets or ferromagnetic material for being attracted to the one or more magnets of the first member, such that the load arm of the first member is attracted to the load arm of the second member. The first member may include one or more magnets within the interior of the load arm, the effort arm, the fulcrum, or some combination of the above. The second member may include one or more magnets (or ferromagnetic material) within the interior of the load arm, the effort arm, the fulcrum, or some combination of the above. Said one or more magnets may be arranged such that the poles i.e., north-south alignment of the magnets, fall along the longitudinal axis 175 of the members, such that the north and south poles of the magnetic field are located at the distal and proximal ends of the members. Alternatively, said one or more magnets may be arranged such that the poles i.e., north-south alignment of the magnets, fall along the lateral axis 150 of the members, such that the north and south poles of the magnetic field are located at or near the side surfaces of the members.

In one embodiment, instead of the first or second member including one or more magnets within the interior of the load arm, the first or second member can simply comprise a magnetized body. This means that the first or second member itself is composed of a material that exhibits the properties of a magnet, i.e., that it emanates a magnetic field. The second member may be magnetized for being attracted to the magnetized body of the first member, such that the first member is attracted to the second member. Said magnetized bodies may be arranged such that the poles i.e., north-south alignment of the magnetized bodies, fall along the longitudinal axis 175 of the members, such that the north and south poles of the magnetic field are located at the distal and proximal ends of the members. Alternatively, they may be arranged such that the poles i.e., north-south alignment of the magnetized bodies, fall along the lateral axis 150 of the members, such that the north and south poles of the magnetic field are located at or near the side surfaces of the members The effort arms 106, 116 of the first and second members 102, 112 include stops 160, 162 that prevent load arms 104, 114 of the first and second members from being separated beyond a threshold distance. That is, once the stops 160, 162 meet when pressed together, the load arms can no longer be separated any further. Lastly, the force required to bring the effort arm of the first member together with the effort arm of the second member comprises standard human digital force.

Figure 2:
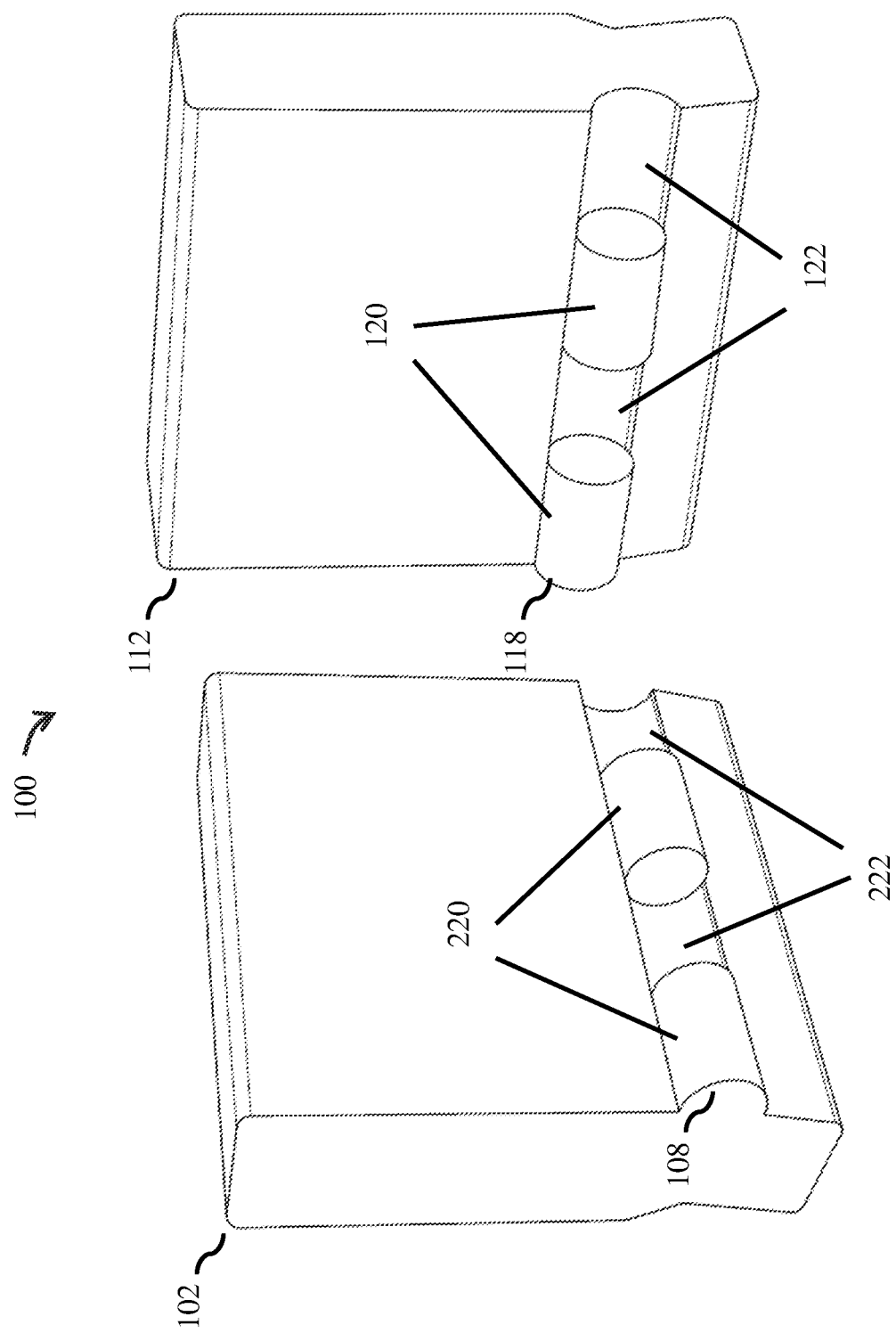
FIG. 2 depicts another exploded side perspective view of the magnetic clip in use, according to the embodiment of FIG. 1.

FIG. 2 depicts another exploded side perspective view of the magnetic clip 100 in use, according to the embodiment of FIG. 1. FIG. 2 shows the first member 102 comprising a fulcrum 108 where the load and effort arms meet, the fulcrum including one or more protrusions 220 and one or more depressions 222. The second member 112 shows a fulcrum 118 where the load and effort arms meet, the fulcrum including one or more protrusions 120 and one or more depressions 122. The protrusions 120 of the second member are sized and shaped to mate with the depressions 222 of the first member, and the depressions 122 of the second member are sized and shaped to mate with the protrusions 220 of the first member. The depressions 222, 122 may be concave shaped or cylindrical shaped. The protrusions 220, 120 may be cylindrical shaped and have the same size as the depressions 222, 122. In one embodiment, the concave shaped or cylindrical shaped depressions 222, 122 may extend the entire width of the fulcrum along the lateral axis 150 of the members, and the protrusions 220, 120 may rest within the depressions, such that half of the protrusions rest within the depressions and half of the protrude extends, or protrudes, out of said depressions.

FIG. 3 depicts a side perspective view of the magnetic clip 100 in use, according to the embodiment of FIG. 1. FIG. 2 shows that when the effort arm 106 of the first member 102 is brought together with the effort arm 116 of the second member 112, the load arm 104 travels away from the load arm 114 and an opening is created between the load arms, into which an item, such as paper 302, may be inserted.

FIG. 4 depicts a front perspective view of the magnetic clip 100 in use, according to the embodiment of FIG. 1. FIG. 3 shows that when load arm 104 of the first member 102 is brought together with the load arm 114 of the second member 112, said opening between the two load arms is closed, causing the clip to grip paper 302. At the same time, an opening is created between the effort arms 106, 116. FIG. 3 also show that the magnetic nature of the rear surface of the first member 102 allows the magnetic clip 100 to be magnetically coupled to the ferromagnetic surface 402, such as a refrigerator. Said one or more magnets of the clip may be arranged such that the poles, i.e., north-south alignment of the magnets, fall along the front-to-rear axis 450 of the members, such that the north and south poles of the magnetic field are located at the front and rear surfaces of the members. This arrangement allows the clip 100 to be used to clip a paper, such as a note or reminder, to a surface such as a refrigerator.

Figure 5:
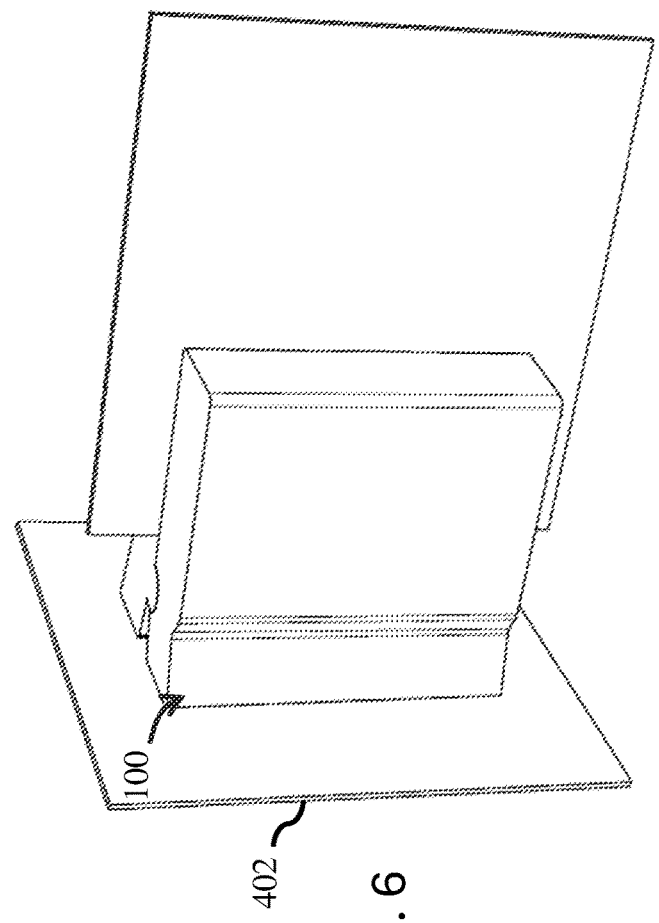
FIG. 5 depicts a side perspective view of the magnetic clip in use, according to the embodiment of FIG. 1.

FIG. 5 depicts a side perspective view of the magnetic clip 100 in use, according to the embodiment of FIG. 1. FIG. 5 shows that when load arm 104 of the first member 102 is brought together with the load arm 114 of the second member 112, said opening between the two load arms is closed, causing the clip to grip paper 302. At the same time, an opening is created between the effort arms 106, 116. FIG. 5 also show that the magnetic nature of the side surface of the first and second members 102, 112 allows the magnetic clip 100 to be magnetically coupled to the ferromagnetic surface 402, such as a refrigerator. Said one or more magnets of the clip may be arranged such that the poles, i.e., north-south alignment of the magnets, fall along the lateral axis 150 of the members (see FIG. 1), such that the north and south poles of the magnetic field are located at the sides of the members.

Figure 6:
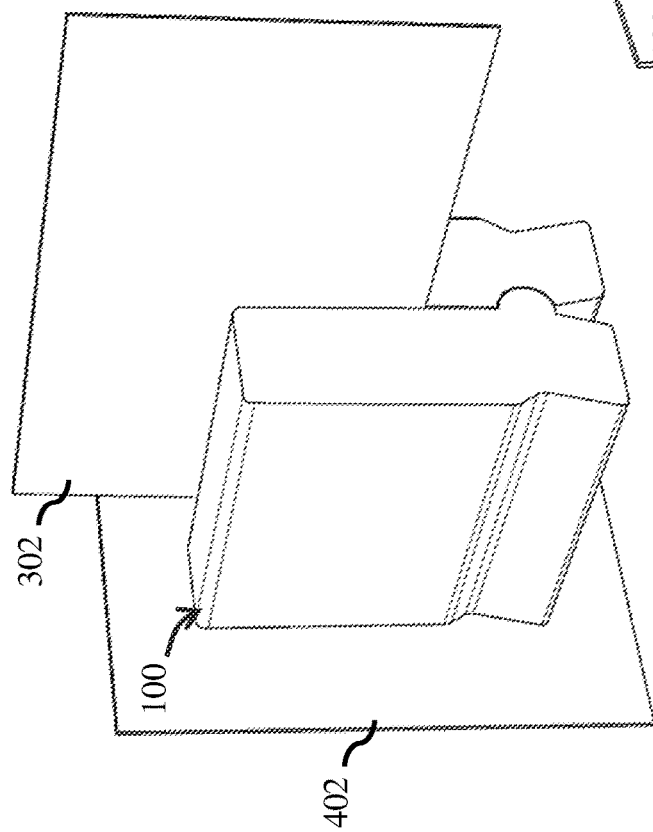
FIG. 6 depicts a front perspective view of the magnetic clip in use, according to the embodiment of FIG. 1.

FIG. 6 depicts a front perspective view of the magnetic clip 100 in use, according to the embodiment of FIG. 1. FIG. 6 shows that the magnetic nature of the bottom surface of the first and second members 102, 112 allows the magnetic clip 100 to be magnetically coupled to the ferromagnetic surface 402. Said one or more magnets of the clip may be arranged such that the poles, i.e., north-south alignment of the magnets, fall along the longitudinal axis 175 of the members (see FIG. 1), such that the north and south poles of the magnetic field are located at the tops and bottoms of the members.

Figure 7:
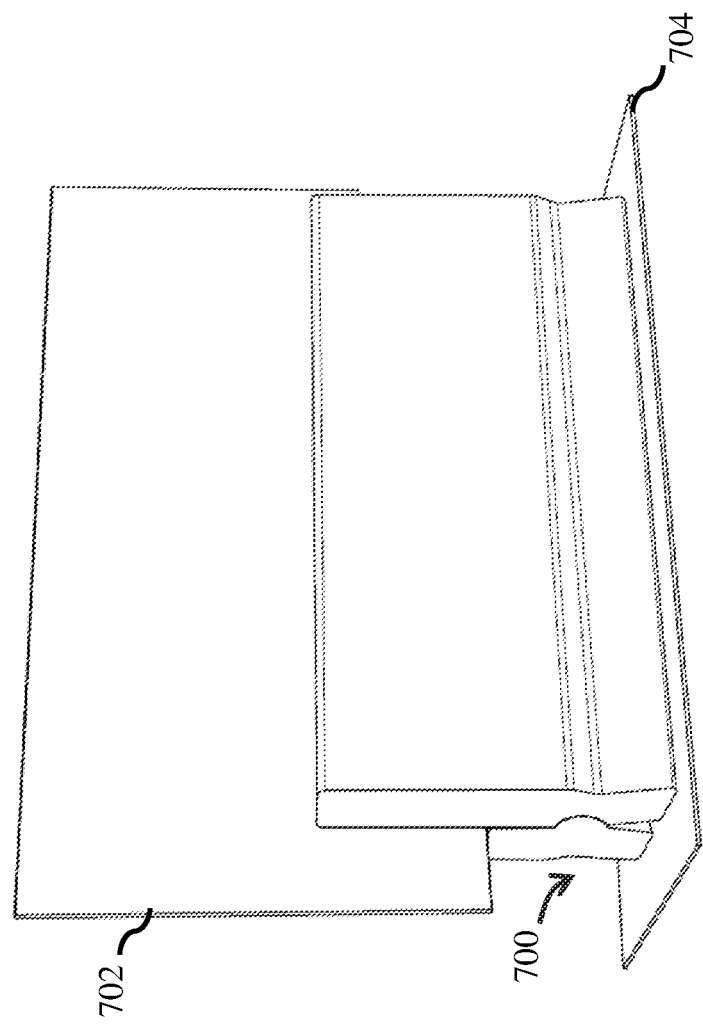
FIG. 7 depicts a front perspective view of a magnetic clip in use, according to another embodiment.

FIG. 7 depicts a front perspective view of a magnetic clip 700 in use, according to another embodiment. Note the magnetic clip 700 has load arms that are wider than those of the magnetic clip 100. FIG. 7 shows that when the load arm of the first member of the clip 700 is brought together with the load arm of the second member, so as to grip paper 702, an opening is created between the effort arms of the members of the clip 700. FIG. 7 shows that the width of the effort arms, the large surface area of the bottom of the effort arms and the gap between the effort arms provide a stable base that allows the magnetic clip 700 to be stood upright along axis 175 (see FIG. 1). FIG. 7 shows that the magnetic clip 700 is stood upright on flat surface 704 such that the paper 702 is also held upright for a viewer to easily see and read.

Figure 8:
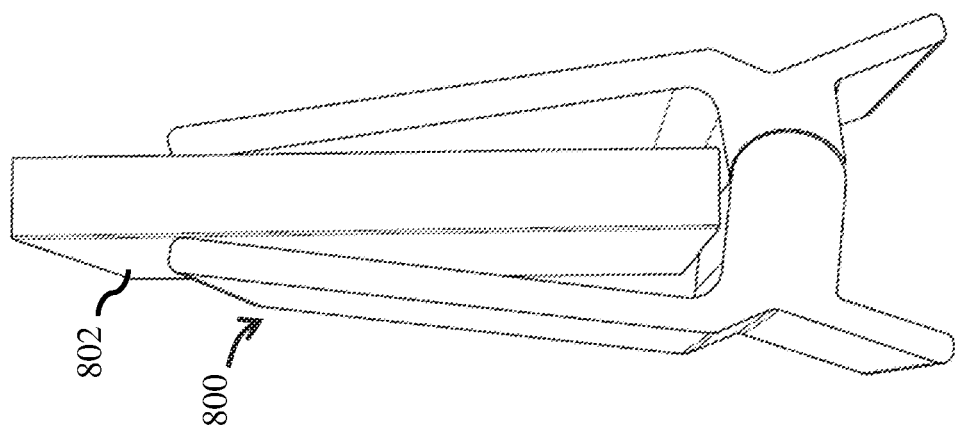
FIG. 8 depicts a side perspective view of a magnetic clip in use, according to another embodiment.

FIG. 8 depicts a side perspective view of a magnetic clip 800 in use, according to another embodiment. Note the magnetic clip 800 has load and effort arms that are less thick than those of the magnetic clip 100. This allows for a greater gap between the load arms when they are separated, which allows for gripping of thicker materials, such as a thick item or block 802 shown in FIG. 8. FIG. 8 shows that when the load arm of the first member of the clip 800 is brought together with the load arm of the second member, so as to grip block 802, an opening is created between the effort arms of the members of the clip 800. FIG. 8 shows that the width of the effort arms and the gap between the effort arms provide a stable base that allows the magnetic clip 800 to be stood upright along axis 175 (see FIG. 1). FIG. 8 shows that the magnetic clip 800 is stood upright such that the block 802 is also held upright for a viewer to easily see.

Figure 9:
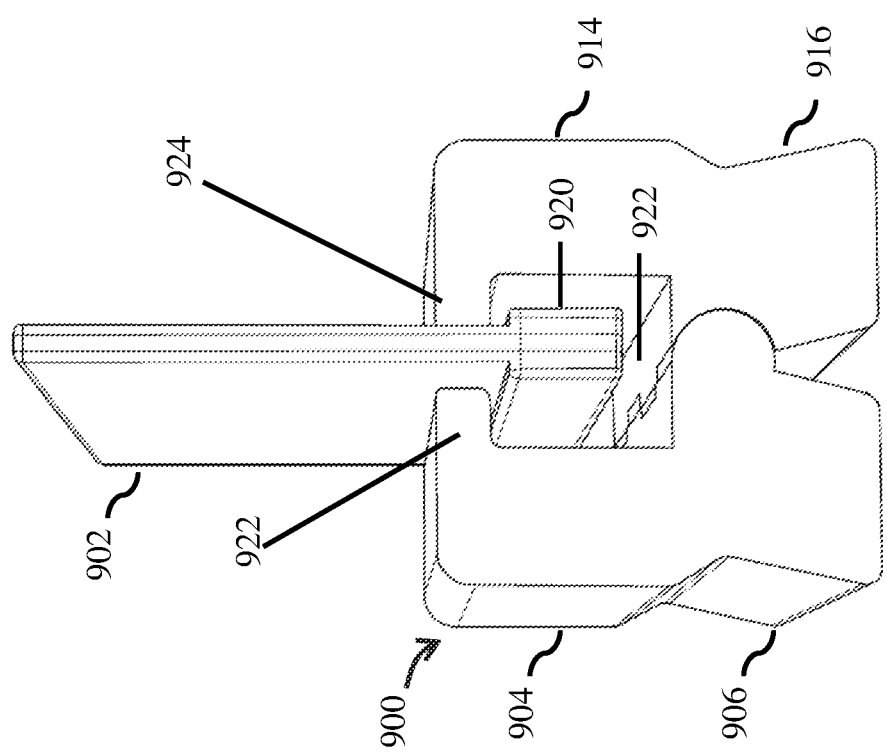
FIG. 9 depicts a side perspective view of a magnetic clip in use, according to another embodiment.

FIG. 9 depicts a side perspective view of a magnetic clip 900 in use, according to another embodiment. Note the magnetic clip 900 has load arms 904, 914 and effort arms 906, 916 that are thicker than those of the magnetic clip 100. Note also that magnetic clip 900 has a protruding lip 922 at the top of the load arm 904 and a protruding lip 924 at the top of the load arm 914, such that the protruding lips 922, 924 meet when the load arms 904, 914 come together. Note also that when the load arms 904, 914 come together, there is an open space 922 between the load arms, which is not found in the magnetic clip 100. This allows for a gap between the load arms when the protruding lips 922, 924 come together, which allows for gripping of materials or items that have a thicker bottom area 920, such as item or block 902 shown in FIG. 9.

Figure 10:
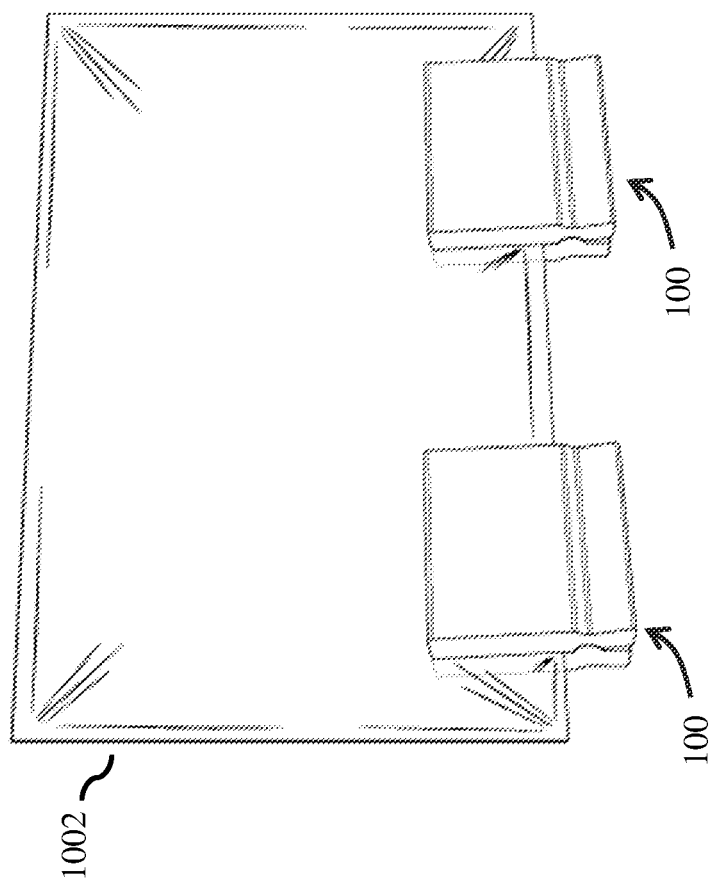
FIG. 10 depicts a front perspective view of a pair of magnetic clips in use, according to the embodiment of FIG. 1.

FIG. 10 depicts a front perspective view of a pair of magnetic clips 100 in use, according to the embodiment of FIG. 1. A pair of the magnetic clips 100 has been attached to a plastic sous vide bag 1002, so as to weigh the bag down, resulting in the entire bag staying under water.

Figure 11:
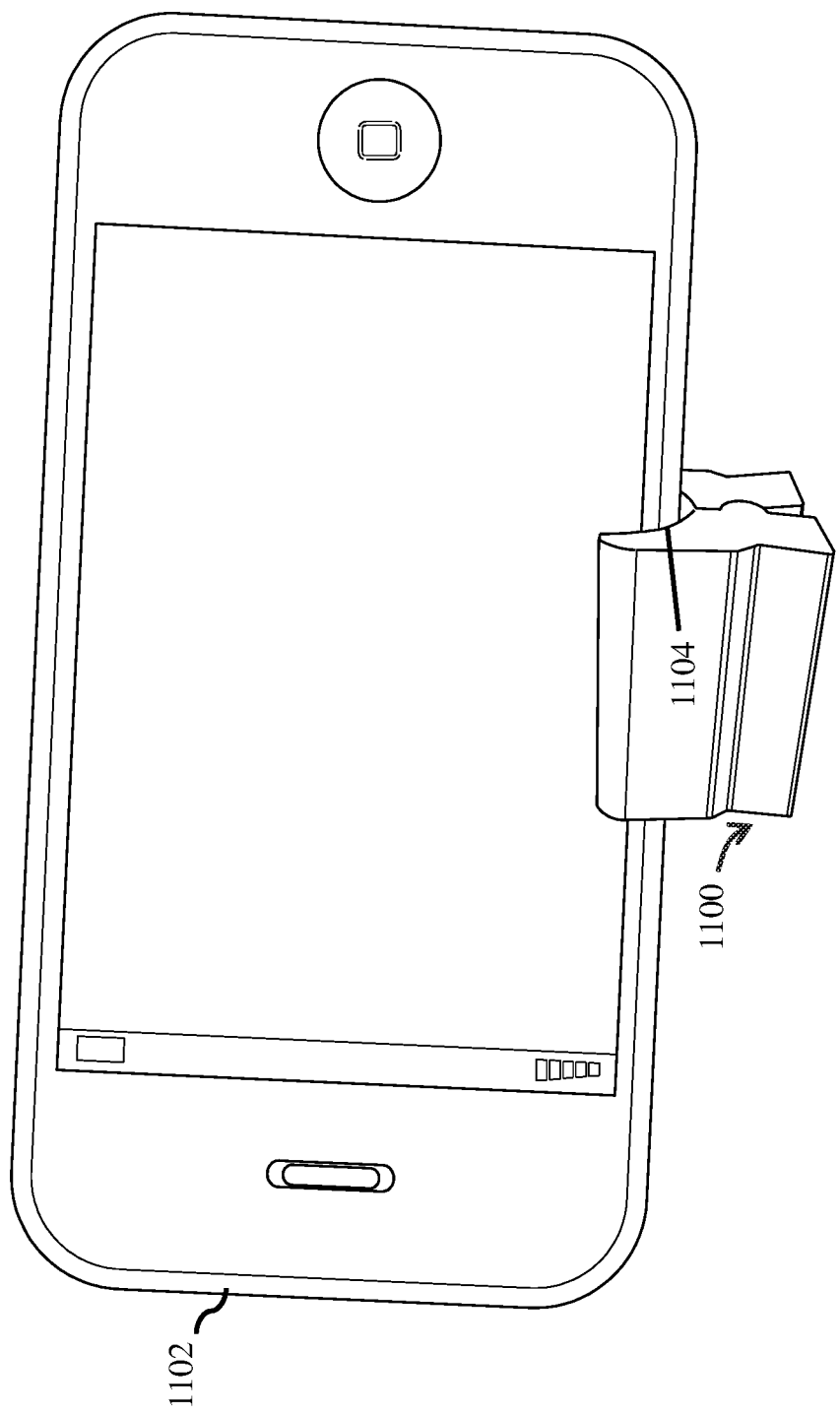
FIG. 11 depicts a front perspective view of a magnetic clip in use, according to another embodiment.

FIG. 11 depicts a front perspective view of a magnetic clip 1100 in use, according to another embodiment. Note the magnetic clip 1100 has load arms that are wider and thicker than those of the magnetic clip 100. FIG. 1100 shows that when the load arm of the first member of the clip 1100 is brought together with the load arm of the second member, so as to grip cell phone 1102, an opening is created between the effort arms of the members of the clip 1100. The interior surface of the jaw 1104, i.e., the interior surface of the load arms, may include a rubber or other gripping surface that provides purchase onto the item that is being gripped, such as a cell phone. The interior of the jaw 1104, i.e., the interior surface of the load arms, may be concave shaped to provide a volume for gripping the cell phone. FIG. 11 shows that the width of the effort arms, the large surface area of the bottom of the effort arms and the gap between the effort arms provide a stable base that allows the magnetic clip 1100 to be stood upright along axis 175 (see FIG. 1). FIG. 11 shows that the magnetic clip 1100 is stood upright on a flat surface such that the cell phone 1102 is also held upright for a viewer to easily see and read.

Figure 12:
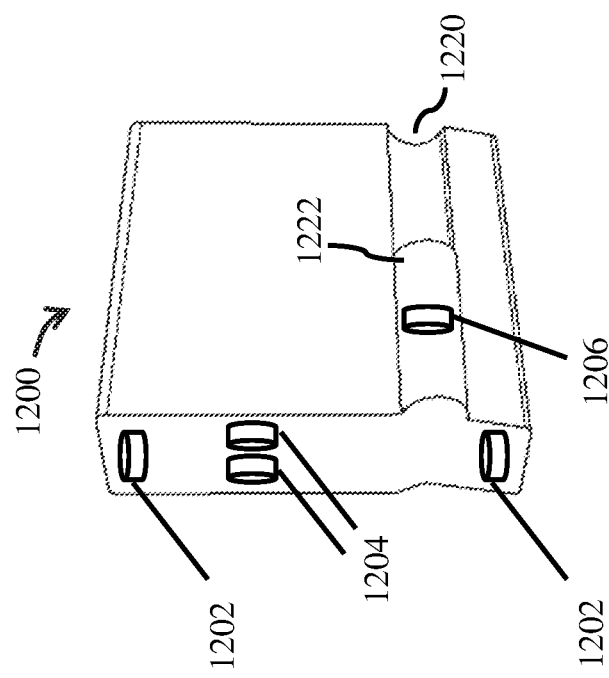
FIG. 12 depicts a side perspective view of a member of the magnetic clip, according to another embodiment.

FIG. 12 depicts a side perspective view of a member 1200 of the magnetic clip, according to another embodiment. FIG. 12 shows an embodiment wherein the member 1200 includes only one cylindrical protrusion 1222 and one cylindrical depression 1220 in the fulcrum of the member 1200. Note that when the protrusion of a second member (not shown) movably and removably mates with the depression 1220 of the member 1200 and the depression of the second member movably and removably mates with the protrusion 1222 of the member 1200, lateral movement between the members is restricted. Also, FIG. 12 shows that the protrusion of the member 1200 may be a concave shaped feature and the depression of the member 1200 may be a convex shaped feature configured to movably and removably mate with a similarly shaped second member.

In one embodiment, the member 1200 of the claimed magnetic clip utilizes front-back magnetization. This includes arranging one or more magnets 1204 such that the poles, i.e., north-south alignment of the magnets, fall along the front-to-rear axis 450 (see FIG. 4) of the member, such that the north and south poles of the magnetic field are located at the front and rear (back) sides of the members. In one alternative, the member that pairs with member 1200 may also have magnets arranged in the front-to-rear axis 450 of the member, with the north and south poles in an opposite orientation. In another alternative, the member that pairs with member 1200 may simply have a ferromagnetic surface that is magnetically attracted to the magnets in member 1200.

In one embodiment, the member 1200 of the claimed magnetic clip utilizes lateral magnetization. This includes arranging one or more magnets 1206 such that the poles, i.e., north-south alignment of the magnets, fall along the lateral axis 150 (see FIG. 1) of the member, such that the north and south poles of the magnetic field are located at the sides of the members. In one alternative, the member that pairs with member 1200 may also have magnets arranged along the lateral axis 150 of the member, with the north and south poles in an opposite orientation. In another alternative, the member that pairs with member 1200 may simply have a ferromagnetic surface that is magnetically attracted to the magnets in member 1200.

In one embodiment, the member 1200 of the claimed magnetic clip utilizes top-bottom magnetization. This includes arranging one or more magnets 1202 such that the poles, i.e., north-south alignment of the magnets, fall along the longitudinal axis 175 (see FIG. 1) of the member, such that the north and south poles of the magnetic field are located at the top and bottom of the members. In one alternative, the member that pairs with member 1200 may also have magnets arranged along the longitudinal axis 175 of the member, with the north and south poles in an opposite orientation. In another alternative, the member that pairs with member 1200 may simply have a ferromagnetic surface that is magnetically attracted to the magnets in member 1200.

In another embodiment, instead of the member 1200 including magnets located within the member, the member itself may have a magnetized body, which may be magnetized such that the poles, i.e., north-south alignment of the magnets, fall along the longitudinal axis 175 of the member, the front-to-rear axis 450 of the member, and/or the lateral axis 150 of the member. The member that pairs with member 1200 may also have a magnetized body, with the north and south poles in an opposite orientation. In one alternative, the member that pairs with member 1200 may simply have a ferromagnetic surface that is magnetically attracted to the magnetized body of member 1200.

Figure 13:
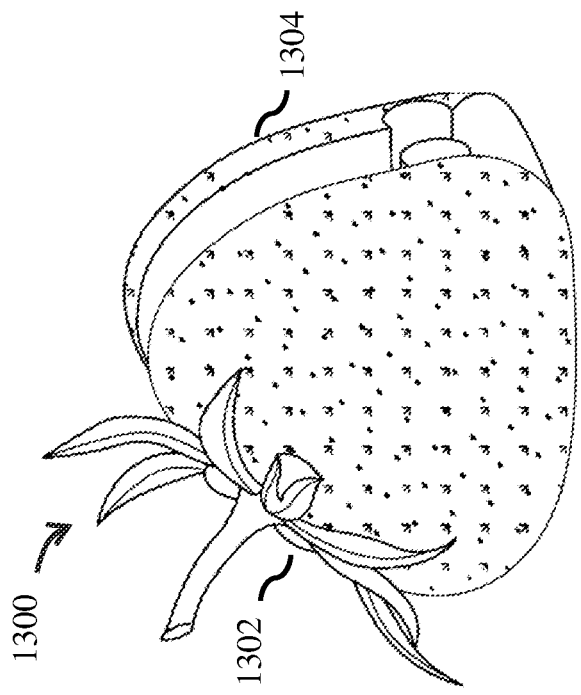
FIG. 13 depicts a front perspective view of a magnetic clip in use, according to another embodiment.

FIG. 13 depicts a front perspective view of a magnetic clip 1300 in use, according to another embodiment. Similar to the magnetic clip 100, the claimed magnetic clip 1300 includes a first member 1302 comprising a load arm and an effort arm, and a second member 1304 comprising a load arm and an effort arm. The rear surface of each member may be sized, shaped, and colored to appear like a decorative item, such as a fruit, a vegetable, a kitchen implement, or any other object, for aesthetic and/or ornamental purposes.

The claimed embodiments are waterproof, food-safe, and easy-to-clean magnetic clips designed for use in sous vide cooking, among other things. Sous vide cooking is a culinary technique that involves sealing food in a vacuum-sealed bag and immersing it in a precisely temperature-controlled water for extended periods. The technique relies on maintaining a consistent low temperature to achieve desired results such as even cooking, enhanced flavor infusion, and improved texture. The importance of keeping the complete immersion of the sous vide bag ensures that heat is evenly distributed around the food, promoting consistent cooking. It also prevents the formation of air pockets, which can hinder the heat transfer and lead to unevenly cooked or undercooked portions. By maintaining full contact with the water, the food is evenly surrounded by the controlled temperature, resulting in a tender, juicy, and evenly cooked product. The claimed embodiments create enough downward force to counteract buoyancy and keep the food fully submerged.

The claimed embodiments also feature a strong grip mechanism that securely fastens the bag to prevent it from floating to the surface. This ensures consistent contact with the water, enabling efficient heat transfer and maintaining the desired cooking temperature. Additionally, the claimed embodiments are waterproof, so they can withstand prolonged immersion in the water bath without any risk of damage. The claimed embodiments are waterproof, food-safe, and easy-to-clean magnetic clips that provide a practical solution for sous vide cooking. Maintaining the bag's full immersion in water is crucial for achieving consistent and high-quality results in sous vide cooking, and the claimed embodiments contribute to the effective submergence of buoyant food, thereby keeping the food submerged during cooking, which is essential for achieving optimal results with the sous vide technique.

The claimed embodiments may be constructed from various materials, including stainless steel, plastic, silicone, or BPA-free plastic. The claimed embodiments may be constructed from materials chosen for their waterproof properties, food safety compliance, and ease of cleaning, thereby ensuring compliance with food safety regulations while offering durability and ease of maintenance.

The manufacturing of the components of the claimed magnetic clip can leverage a variety of materials, each selected for its specific properties that contribute to the functionality, durability, and usability of the magnetic clip. Below is discussed the types of materials that may be used for manufacturing different components of the magnetic clip, highlighting how each material's unique characteristics make it suited for its intended application.

Neodymium iron boron is a commonly used material that may be used for the magnets in the magnetic clip. Neodymium magnets are known for their high magnetic strength, which is critical for ensuring a secure grip between the two arms of the clip. Despite their strength, these magnets can be produced in small sizes, making them ideal for compact designs without compromising on the magnetic clip's holding power. Another option for the magnets is samarium cobalt, which offers excellent thermal stability, retaining its magnetic properties in environments with wide temperature ranges. Samarium cobalt magnets are particularly suited for magnetic clips used in applications subject to significant temperature variations, such as sous vide cooking or outdoor use. There are several processes for making magnets, including a method a called powder metallurgy wherein a suitable composition is pulverized into fine powder, compacted and heated to cause densification via liquid phase sintering. The magnet may include a protective coating such as dry-sprayed epoxy, epoxy, electrolytic nickel, aluminum IVD, and combinations of these coatings. The magnets can also be coated with conversion coatings such as zinc, iron or manganese phosphates and chromates.

Stainless steel may be used to manufacture the load arm, effort arm, and fulcrum due to its corrosion resistance, strength, and durability. Stainless steel is especially suitable for kitchen applications or any environment where moisture and cleanliness are concerns. The material's ability to withstand frequent cleaning without degrading makes it ideal for components that are handled often or come into contact with food. For a lightweight option, anodized aluminum provides strength similar to stainless steel but at a fraction of the weight. The anodization process enhances corrosion resistance and allows for color customization, which can be used to create visually appealing or color-coded magnetic clips. Aluminum's thermal conductivity is relatively low, which minimizes heat transfer to the user's hand during high-temperature applications. Some stainless steels are corrosion-resistant but non-magnetic (such as 316) and would not be good candidate materials. Other categories of stainless steel are highly resistant to corrosion and carry a magnetic field (such as 420 and 430 grades) so they would be good candidate materials.

Silicone rubber can be used to coat or create grip-enhancing features on the magnetic clip. Its soft, non-slip texture provides a comfortable and secure grip, reducing the risk of the clip slipping out of the user's hand. Silicone is also heat-resistant, making it suitable for applications involving high temperatures. Its hypoallergenic and non-reactive properties ensure safety and durability in kitchen environments. Thermoplastic elastomers may also be used for the grip enhancements since they combine the flexibility of rubbers with the recyclability of plastics. Thermoplastic elastomers can be molded into ergonomic shapes that enhance grip and user comfort. Thermoplastic elastomers are also resistant to many cleaning agents, making them suitable for applications requiring frequent sanitation.

Powder coating can be applied to metal parts of the magnetic clip for color, texture, and additional corrosion resistance. Powder coatings are durable, resistant to chipping, and available in a wide range of colors, allowing for customization and branding opportunities. For a high-end finish, chrome plating can be applied to metal components. It provides a mirror-like finish, enhancing aesthetic appeal while also offering additional corrosion resistance. Chrome plating is particularly suited for the external surfaces of the magnetic clip, where appearance is critical.

In considering the practical and economic aspects of manufacturing the claimed clip, one embodiment involves the utilization of ceramic or ferrite magnets for one or both halves of the product. These magnets are crafted from pressed ceramic powder and are renowned for their cost-effectiveness and satisfactory magnetic strength for a wide array of applications, including those pertinent to our magnetic clip. The intrinsic properties of ceramic magnets make them an ideal choice, offering a balanced compromise between the magnetic force required to efficiently function as proposed and the imperative to keep production costs to a minimum. This approach not only ensures that the magnetic clip remains affordable for mass production and consumer purchase but also maintains the device's effectiveness and reliability in everyday use. Ceramic magnets, therefore, represent a pragmatic solution that aligns with the economic and functional objectives of this invention.

Embodiments may be described above with reference to functions or acts, which comprise methods. The functions/acts noted above may occur out of order as shown or described. For example, two functions/acts shown or described in succession may in fact be executed substantially concurrently or the functions/acts may sometimes be executed in the reverse order, depending upon the functionality/acts involved. While certain embodiments have been described, other embodiments may exist. Further, the disclosed methods' functions/acts may be modified in any manner, including by reordering functions/acts and/or inserting or deleting functions/acts, without departing from the spirit of the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A magnetic clip comprising:
   a) a first member comprising a load arm and an effort arm, including an obtuse angle between the load and effort arms of the first member;
   b) a magnet located within an interior of the first member;
   c) a fulcrum in the first member where the load and effort arms meet, the fulcrum including a protrusion and a depression;
   d) a second member comprising a load arm and an effort arm, including an obtuse angle between the load and effort arms of the second member;
   e) a magnet located within an interior of the second member, wherein said magnet of the second member is configured for being attracted to the magnet of the first member, such that the load arm of the first member is attracted to the load arm of the second member; and
   f) a fulcrum in the second member where the load and effort arms of the second member meet, the fulcrum of the second member including a protrusion and a depression, such that the protrusion of the second member is configured to movably and removably mate with the depression of the first member and wherein the depression of the second member is configured to movably and removably mate with the protrusion of the first member,
   g) wherein the first and second members are configured to effectuate: 1) a first disengaged position wherein the first and second members are distinct and separable components; and 2) a second engaged position wherein the first and second members are held together solely by magnetic attraction resulting from the magnet.

2. The magnetic clip of claim 1, wherein the magnet of the first member is located within an interior of the load arm of the first member.

3. The magnetic clip of claim 2, wherein the magnet of the second member is located within an interior of the load arm of the second member.

4. The magnetic clip of claim 3, wherein when the load arm of the first member is brought together with the load arm of the second member, an opening is created between the effort arm of the first member and the effort arm of the second member.

5. The magnetic clip of claim 4, wherein when the effort arm of the first member is brought together with the effort arm of the second member, an opening is created between the load arm of the first member and the load arm of the second member.

6. The magnetic clip of claim 5, wherein when the protrusion of the second member movably and removably mates with the depression of the first member and when the depression of the second member movably and removably mates with the protrusion of the first member, lateral movement between the first and second members is restricted.

7. The magnetic clip of claim 6, wherein the protrusions of the first and second members are concave shaped features.

8. The magnetic clip of claim 7, wherein the depressions of the first and second members are convex shaped features configured to movably and removably mate with the protrusions of the first and second members.

9. The magnetic clip of claim 8, wherein the effort arms of the first and second members include stops that prevent load arms of the first and second members from being separated beyond a threshold distance.

10. The magnetic clip of claim 9, wherein the force required to bring the effort arm of the first member together with the effort arm of the second member comprises standard human digital force.

11. A magnetic clip comprising:
    a) a first member comprising a load arm and an effort arm, including an obtuse angle between the load and effort arms of the first member;
    b) the first member comprising a magnetized body;
    c) a fulcrum in the first member where the load and effort arms meet, the fulcrum including a protrusion and a depression;
    d) a second member comprising a load arm and an effort arm, including an obtuse angle between the load and effort arms of the second member;
    e) a ferromagnetic material located within an interior of the second member, wherein said ferromagnetic material of the second member is configured for being attracted to the magnetized body of the first member, such that the load arm of the first member is attracted to the load arm of the second member; and
    f) a fulcrum in the second member where the load and effort arms of the second member meet, the fulcrum of the second member including a protrusion and a depression, such that the protrusion of the second member is configured to movably and removably mate with the depression of the first member and wherein the depression of the second member is configured to movably and removably mate with the protrusion of the first member,
    g) wherein the first and second members are configured to effectuate: 1) a first disengaged position wherein the first and second members are distinct and separable components; and 2) a second engaged position wherein the first and second members are held together solely by magnetic attraction resulting from the magnetized body of the first member.

12. The magnetic clip of claim 11, wherein the magnetized body of the first member comprises the load arm of the first member.

13. The magnetic clip of claim 12, wherein the ferromagnetic material of the second member is located within an interior of the load arm of the second member.

14. The magnetic clip of claim 13, wherein when the load arm of the first member is brought together with the load arm of the second member, an opening is created between the effort arm of the first member and the effort arm of the second member.

15. The magnetic clip of claim 14, wherein when the effort arm of the first member is brought together with the effort arm of the second member, an opening is created between the load arm of the first member and the load arm of the second member.

16. The magnetic clip of claim 15, wherein when the protrusion of the second member movably and removably mates with the depression of the first member and when the depression of the second member movably and removably mates with the protrusion of the first member, lateral movement between the first and second members is restricted.

17. The magnetic clip of claim 16, wherein the protrusions of the first and second members are concave shaped features.

18. The magnetic clip of claim 17, wherein the depressions of the first and second members are convex shaped features configured to movably and removably mate with the protrusions of the first and second members.

19. The magnetic clip of claim 18, wherein the effort arms of the first and second members include stops that prevent load arms of the first and second members from being separated beyond a threshold distance.

20. The magnetic clip of claim 19, wherein the force required to bring the effort arm of the first member together with the effort arm of the second member comprises standard human digital force.

\* \* \* \* \*